US008473355B2

(12) United States Patent
Quigley et al.

(10) Patent No.: US 8,473,355 B2
(45) Date of Patent: Jun. 25, 2013

(54) SYSTEM AND METHOD FOR ELECTRONIC WALLET CONVERSION

(75) Inventors: Benjamin Quigley, Reston, VA (US); Robert Sandler, Herndon, VA (US); Fletcher Jones, Bethesda, MD (US); Rajesh Mahajan, Fremont, CA (US); Prakash Muppirala, San Jose, CA (US); David Lowe, Foster City, CA (US); Laura Price, Durham, NC (US); Seth Goldstein, San Francisco, CA (US); Venkatesh Subramanya, Banglore (IN); Jai Rawat, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 2004 days.

(21) Appl. No.: 10/690,145

(22) Filed: Oct. 20, 2003

(65) Prior Publication Data

US 2005/0086068 A1 Apr. 21, 2005
US 2010/0332336 A9 Dec. 30, 2010

Related U.S. Application Data

(63) Continuation-in-part of application No. 10/313,748, filed on Dec. 6, 2002, now Pat. No. 7,346,587.

(51) Int. Cl.
*G06Q 30/00* (2012.01)
(52) U.S. Cl.
USPC ............................................ 705/26.1; 705/44
(58) Field of Classification Search
USPC ............................................ 705/26, 26.1, 44
See application file for complete search history.

(56) References Cited

U.S. PATENT DOCUMENTS

| 5,774,525 A | 6/1998 | Kanevsky et al. ............... 379/88 |
| 5,987,440 A | 11/1999 | O'Neil et al. ..................... 705/44 |

(Continued)

FOREIGN PATENT DOCUMENTS

| JP | 2001-242785 | 9/2001 |
| JP | 2002-215172 | 7/2002 |

(Continued)

OTHER PUBLICATIONS

Roberts, Ed. "Online Payments Raising Host of Unresolved Issues". Credit Union Journal. New York: Feb. 18, 2002. vol. 6, Iss. 7; p. 1.*

(Continued)

*Primary Examiner* — Eric T Wong
(74) *Attorney, Agent, or Firm* — Keller Jolley Preece (57) ABSTRACT

A system and method for electronic wallet conversion allows conversion of a basic electronic wallet to a more flexible wallet account, providing additional services and requiring additional authentication. The basic accountholder eventually requires the additional services provided by the more flexible wallet, typically editing rights and making purchases at sites requiring authentication beyond the basic level. To convert the account, the account holder is presented with a one-time challenge and response mechanism that requires the accountholder to summon information that only the account holder would know. If a successful match is made, the account is converted to the more flexible account for all time. The accountholder replaces the one-time challenge and response with a second-level password that grants the accountholder ongoing access to more sensitive wallet features, such as the ability to purchase at sites requiring a second-level password, and editing rights to the information stored in the wallet.

13 Claims, 7 Drawing Sheets

U.S. PATENT DOCUMENTS

| | | | |
|---|---|---|---|
| 6,058,478 A | 5/2000 | Davis | 713/91 |
| 6,070,243 A | 5/2000 | See et al. | 713/201 |
| 6,078,902 A | 6/2000 | Schenkler | 705/35 |
| 6,079,021 A | 6/2000 | Abadi et al. | 713/202 |
| 6,105,010 A | 8/2000 | Musgrave | 705/44 |
| 6,108,644 A | 8/2000 | Goldschlag et al. | 705/69 |
| 6,112,181 A | 8/2000 | Shear et al. | 705/1 |
| 6,292,892 B1 | 9/2001 | Davis | 713/156 |
| 6,349,338 B1 | 2/2002 | Seamons et al. | 709/229 |
| 6,367,009 B1 | 4/2002 | Davis et al. | 713/166 |
| 6,393,126 B1 | 5/2002 | Van der Kaay et al. | 380/241 |
| 6,460,141 B1 | 10/2002 | Olden | 713/201 |
| 6,477,648 B1* | 11/2002 | Schell et al. | 726/22 |
| 6,560,581 B1 | 5/2003 | Fox et al. | 705/51 |
| 6,807,574 B1* | 10/2004 | Partovi et al. | 709/224 |
| 6,873,974 B1* | 3/2005 | Schutzer | 705/41 |
| 6,944,669 B1* | 9/2005 | Saccocio | 709/229 |
| 7,231,657 B2* | 6/2007 | Honarvar et al. | 726/2 |
| 2001/0037451 A1* | 11/2001 | Bhagavatula et al. | 713/155 |
| 2002/0004772 A1* | 1/2002 | Templeton et al. | 705/35 |
| 2002/0053020 A1 | 5/2002 | Teijido et al. | 713/153 |
| 2002/0111919 A1* | 8/2002 | Weller et al. | 705/67 |
| 2002/0147645 A1* | 10/2002 | Alao et al. | 705/14 |
| 2002/0169874 A1* | 11/2002 | Batson et al. | 709/225 |
| 2002/0186255 A1* | 12/2002 | Shafron et al. | 345/810 |
| 2003/0008672 A1 | 1/2003 | Fujii | 455/456 |
| 2004/0039909 A1* | 2/2004 | Cheng | 713/169 |
| 2004/0059636 A1* | 3/2004 | McClung et al. | 705/26 |
| 2004/0260647 A1* | 12/2004 | Blinn et al. | 705/41 |
| 2005/0097049 A1* | 5/2005 | Writer et al. | 705/44 |

FOREIGN PATENT DOCUMENTS

| | | |
|---|---|---|
| WO | 99/60748 | 11/1999 |
| WO | 00/04673 | 1/2000 |
| WO | 00/11832 | 3/2000 |

OTHER PUBLICATIONS

Paypal. "User Agreement for Paypal Service". Paypal. Jan. 16, 2003.*

"Go Shopping Without Leaving Home", Channel Surfing, Aug. 2000, vol. 8 Issue 8, pp. 64-67.*

Holeman, S et al.; *Differentially secure multicasting and its implementation methods*; Computers & Security; UK; vol. 21, No. 8, p. 736-49; 2002.

Christianson, B.; *Concluding discussion: when does confidentiality harm security?*;—Security Protocols. 9th International Workshop. Revised Papers (Lecture Notes in Computer Science vol. 2467); Cambridge, UK; Apr. 25-27, 2001.

Burns, J.G.; *Multi-level systems security and interoperability between differently classified networks*; Proceedings of the SPIE—The International Society for Optical Engineering; vol. 3577, p. 188-99; USA; 1999.

Baker, D.B. et al.; *PCASSO: a design for secure communication of personal health information via the Internet*; International Journal of Medical Informatics; vol. 54, No. 2, p. 97-104; Ireland; 1999.

Luo, J.Z. et al.; *Multi-Level network security architecture*; Ruan Jian Xue Bao/Journal of Software v 12 n Suppl. Jun. 2001. p. 172-178; 2001.

www.experian.com; Experian's E-series Solutions; *E-series Online Authentication White Paper*; © Experian Jul. 2001; Orange, CA; USA.

* cited by examiner

AOL Wallet

Step 1 of 2: Add Billing Informati n

| | |
|---|---|
| Card Nickname | |
| Card Type | Visa |
| Card Number | |
| Expiration Date | 9 / 2003 |
| First Name & Middle Initial | |
| Last Name | |
| Address Line 1 | |
| Address Line 2 (Optional) | |
| Address Line 3 (Optional) | |
| City | |
| State | AA - Armed Forces Americas |
| Country | United States |
| ZIP Code | |
| Daytime Phone | (999 999 9999) |
| Evening Phone | (999 999 9999) |

☑ Shipping Address is same as Billing Address.

[Cancel] [Next >>]

Participating Stores | Legal Information | Security & Privacy | Send Feedback | Help
Copyright (c) 2003 America Online, Inc. All rights reserved.

Figure 7

SYSTEM AND METHOD FOR ELECTRONIC WALLET CONVERSION

CROSS REFERENCE TO RELATED APPLICATIONS

This application is a continuation-in-part of U.S. patent application Ser. No. 10/313,748, now U.S. Pat. No. 7,346,587, filed Dec. 6, 2002.

BACKGROUND OF THE INVENTION

1. Field of the Invention

The invention relates to the field of electronic commerce. More particularly, the invention relates to providing electronic wallets with graded levels of service and security according to wallet type.

2. Description of Related Art

A fundamental feature of current network technologies is the provision of network services to individual users by furnishing each user an account. Users then request services through their accounts by logging into a server using a client. In order to guarantee that the party attempting to gain access to an account is actually the rightful accountholder, access is controlled through an authentication process, in which the account holder is required to provide one or more pieces of information, known only to the account holder, before he or she is granted access to network services. Typically, authentication requires provision of a user ID and a password. While such a single level authentication scheme may be suitable for some purposes, for example, a low-risk transaction such as a relatively small purchase in an e-commerce environment, the ease with which passwords are compromised renders single-level authentication schemes unsuitable for more sensitive or higher-risk transactions such as large purchases or access to sensitive data. Increasingly, single-level authentication schemes are being supplemented or replaced by multi-level schemes that provide a hierarchy of authentications according to the level of security desired. D. Kanvesky, M. Yung, W. Zadrozny, Method and apparatus utilizing dynamic questioning to provide secure access control, U.S. Pat. No. 5,774,525 (Jun. 30, 1998) describe an apparatus having an authentication mechanism that uses questioning to provide secure access control. The number and/or type of questions generated may correspond to the security level of the system. Experian E-series online authentication white paper (Jul. 18, 2001) describes an authentication scheme based on a PIN (personal identification number) or password that includes a supporting authentication system using a single challenge-response prompt based on unique account information. The object of the challenge-response prompt is to expose unauthorized users and to provide greater security for transactions such as requesting a new PIN number or password.

As network technology evolves, it is becoming increasingly common for entities such as Internet service providers, online communities and portals to provide e-commerce networks to users and members wherein the entity provides centralized access to a large number of affiliated online merchants. Such e-commerce networks are advantageous to users, providing an enhanced online experience, and often allowing them to purchase goods and services at a significant discount. Affiliating with the e-commerce network provides the merchants with valuable marketing support, the user communities providing large pools of motivated, pre-qualified prospects. Finally, the e-commerce networks are beneficial to their sponsoring entities, allowing them to add value to their basic service and generating additional revenue streams. Frequently, such networks provide digital wallets, in which a user stores his or her billing information, such as billing address and credit card information. P. Hartmann, J. Bezos, S. Kaplan, J. Spiegel, Method and system for placing a purchase order via a communications network, U.S. Pat. No. 5,960,411 (Sep. 28, 1999) describe such a wallet, wherein billing information is automatically supplied from the wallet, eliminating the need for the user to enter billing information every time he or she makes a purchase from one of the affiliated merchants, a significant obstacle to purchasing. Conventionally, digital wallets have required two levels of authentication, for example a normal password plus a supplemental password, sometimes called a shopping password. The requirement of two passwords has posed an obstacle to widespread adoption of digital wallets. It has been difficult to get users to create both passwords, and it is also difficult for users to remember the two passwords.

J. French, J. Wilder, System and method for authentication of network users, U.S. Pat. No. 6,263,447 (Jul. 17, 2001) describes a network authentication system that presents a user with a hierarchy of queries that can be configured to require differing levels of input or award differing levels of authentication. When the authentication process has been satisfied, a digital certificate can be generated that records authentication levels and other information related to the user. The certificate can then be presented in future transactions to avoid the need to re-authenticate the user for each new transaction event. While the digital certificate eliminates the necessity of a user remembering a supplemental password, one of the major obstacles to wallet implementation remains—the necessity of creating more than one password in the first place. The system involves a lengthy preprocessing step wherein the user is asked to provide detailed personal information, a process that many users will avoid because they find it time-consuming and invasive. Furthermore, repeated transmission of a document, even an encrypted one such as a digital certificate, containing detailed personal information about the user poses a significant risk that certificate will be intercepted and the information will fall into the wrong hands.

It would therefore be a great advance to provide electronic wallets that offered greater ease of use, while providing graduated degrees of security appropriate to the user's needs, according to wallet type.

SUMMARY OF THE INVENTION

The invention provides a system and method for electronic wallet conversion that allows for conversion of a first account type, a basic electronic wallet account, offering basic services, to a second account type, a more flexible wallet account, offering an enhanced level of service, and requiring additional authentication. The basic account, referred to herein as a thin wallet, is secured at a basic challenge and response level with a username and a password. Using the thin wallet, the accountholder is able to make purchases using default account information at e-commerce sites that require only the basic level of authentication. Typically, a thin wallet is created for someone making an initial purchase at an e-commerce site associated with an online service, or it is the default wallet account provided for subscribers of an online service or an ISP (Internet service provider). The accountholder eventually requires the additional services provided by the full wallet, typically editing rights and the ability to make purchases at e-commerce sights requiring authentication beyond the basic level. To convert the account, the account holder is presented with a one-time challenge and response mechanism that requires the accountholder to summon personally identifiable information that only the account holder would know; for example, the accountholder may be presented with the last four digits of the credit card number stored in the account and is required to fill in the first twelve digits. If a successful match is made, the accountholder proceeds to replace the one-time challenge and response with a second-level password of the accountholder's choosing that grants the accountholder ongoing access to more sensitive wallet features, such as the ability to purchase at sites requiring a second-level password, and editing rights to the information stored in the wallet.

The system includes at least a wallet server, having a wallet application running thereon, a subscriber database that includes thin wallet records and a wallet database that includes full wallet records. An account holder requests account services by means of a client in communication with the wallet server. Also by means of the client, a user interface is accessible only to a holder of the full wallet account that allows the accountholder to edit account information and preferences.

DETAILED DESCRIPTION

To meet the above need in the art for an electronic wallet that allows greater ease of use while providing graduated degrees of security appropriate to the user's needs, the invention provides a system and method for electronic wallet conversion. The invention recognizes that many end users find the graded levels of authentication presented by conventional wallet accounts burdensome; enough so that users often fail to complete a registration for a wallet account on being asked to configure a second level password. Thus, the user perception that the graded levels of authentication are burdensome and time-consuming has seriously interfered with the widespread adoption of wallet technology.

A fundamental feature of the invention is the provision of different types of wallet accounts. The preferred embodiment of the invention includes thin and full wallets.

The thin wallet account is a basic wallet account requiring only a single authentication procedure, typically a basic challenge/response mechanism requiring the provision of a username and password. The services provided by the thin wallet account are primarily limited to making purchases at e-commerce sites that require only this first level of authentication.

In the current embodiment of the invention, thin wallet accounts are created in either of two ways:

the data required to create the thin wallet account wallet is obtained when a user makes an initial purchase at an e-commerce site associated with the account provider. One skilled in the art will recognize that an account provider will typically be an online service, such as AOL (AMERICA ONLINE INCORPORATED, DULLES Va.) or an ISP (Internet service provider). However, portal sites and online shopping malls might also fill this role. In the current embodiment of the invention, the minimum data set for creating a thin wallet account includes: first and last name, credit card type, credit card number, card expiration date, billing address: street address, city, state and postal code. It should be appreciated that when conducting an online purchase transaction, the user is nearly always required to provide this minimum data set. Advantageously, the invention uses the information provided during the purchase transaction to create a thin wallet account for the purchaser.

Online services and ISP's usually maintain subscriber databases. The invention utilizes information from subscriber records in a subscriber database to create a thin wallet account for every subscriber.

Yet another feature of the thin wallet account is that accountholders are not granted editing rights for the account. This limitation is necessary in view of the lower-level authentication required to make use of the account. Thus, the default account information that has been acquired in either of the ways just described cannot be edited or revised.

Holders of thin wallet accounts are therefore confined to transactions that can be completed using such default account information. Additional limitations may be placed on accountholders. For example, they may be limited to making purchases below a predetermined dollar amount. In the setting of an online service, or an e-commerce shopping service, accountholders may be limited to purchasing from certain vendors. Often, the vendors participating on online shopping portals are integrated to varying degrees. Some for example, may only provide links to sites outside of the portal, or they may have their own transaction processing. Others may be fully integrated, employing the portal transaction processing system. Holders of thin wallet accounts may be confined to transacting with a particular subset of vendors, such as those whose transaction processing is fully integrated with the portal. Nevertheless, the basic level of service provided by the thin wallet account is calculated to meet the needs of a significant portion of end users, and it accomplishes one of the objects of the invention, that of encouraging the adoption of the wallet account by end users who would otherwise find it burdensome. It makes the most widespread, low-risk features of the wallet far easier to sign up for and to use.

As the term implies, a full wallet account is a more flexible account offering an expanded feature set. Unlike the thin wallet, the full wallet involves graded levels of authentication. Not only must the accountholder authenticate at the basic level, previously described, but they must authenticate at a higher level by negotiating a second-level security challenge, for example by providing a second-level password, or answering a user-configurable account security question, in order to take advantage of the full array of features and services provided by the full wallet. One skilled in the art should readily appreciate that additional levels of authentication are possible, according to the level of security the account provider wishes to enable for wallet accounts. Primarily, accountholders are granted rights to access and edit sensitive account information, the preferences for example, or the credit card information, or addresses.

Other functionality of the full wallet includes the ability to make higher-ticket purchases that carry a higher limit or perhaps no limit at all. Significantly, accountholders have the capability of purchasing at sites that require the additional level or levels of authentication.

While the thin wallet meets the needs of a large number of online users, the invention recognizes that for many users, a time will come when they will need the additional level of security provided by the full wallet account. Advantageously, the invention provides a method for converting a wallet account of a first type, for example, the thin wallet, to an account of a second type, the full wallet, by presenting the accountholder with a one-time challenge response mechanism. When the accountholder successfully clears the challenge, the account is converted to the second account type, for all time.

Figure 1:
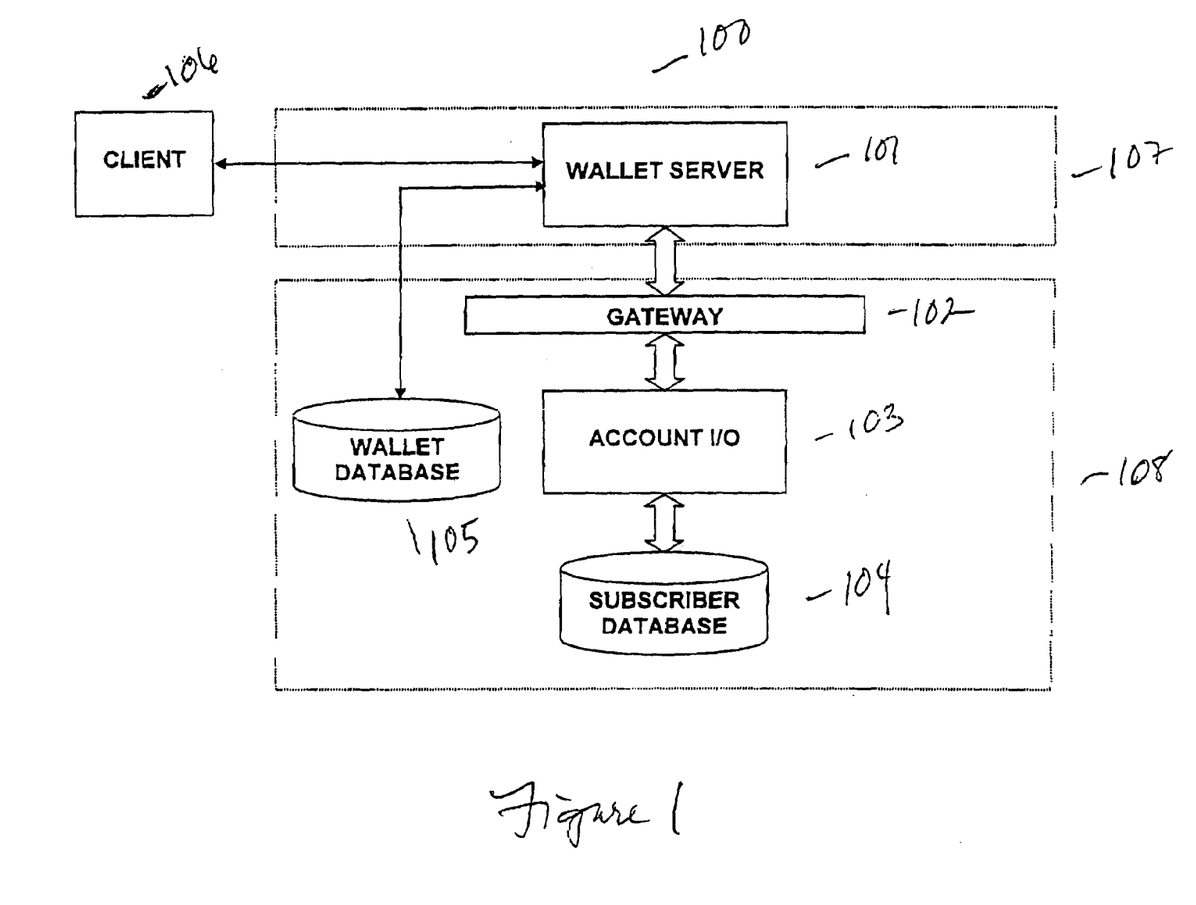
FIG. 1 provides an architecture diagram of a system for converting a wallet account according to the invention.

Referring now to FIG. 1, shown is an architectural diagram of a system 100 for converting a wallet account that provides the functionality necessary to offer end users the thin wallet account and the capability of converting the thin wallet account to a full wallet. In the preferred embodiment of the invention, a wallet server 101 is in communication with an account I/O (input/output) server 103, through the intermediation of a gateway 102. As shown, the wallet server 101 occupies a first network 107, while account I/O server 103 occupies a second network. In one embodiment of the invention, the first network 107 is the Internet or a similar publicly accessible data network; while the second network 108 is the network infrastructure of an online service or an ISP. One skilled in the art will recognize that other configurations are possible. As shown here, the gateway connects the two networks, each using different communication protocols so that information can be passed between the two. However, if the invention were implemented across a single network, or if the networks employed the same communications protocol, a gateway would be rendered unnecessary. One will recognize that a network gateway is conventionally a router.

Figure 7:
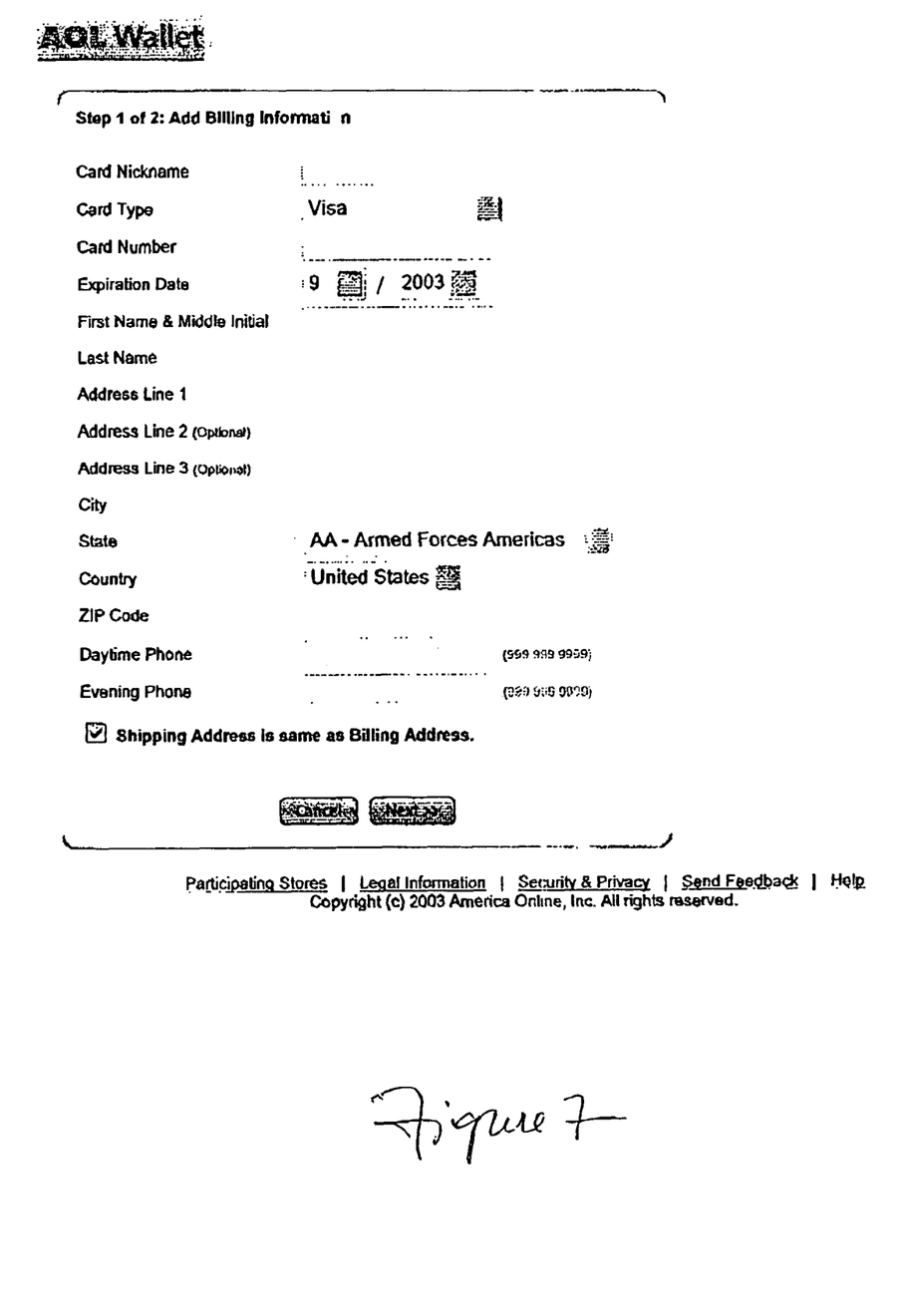
FIG. 7 shows a graphical user interface for editing full wallet information and preferences, according to the invention.

In the preferred embodiment of the invention, the wallet server 101 is a web server having installed thereon a wallet software application that has as its primary function receiving requests from the client 106 and relaying them to the wallet and subscriber databases 104, 105. It is to be appreciated that the wallet software application actually consists of computer-readable code for programming the server to perform the various tasks associated with its role. Using a low-level communications protocol, messages are transmitted between the account I/O server 103 and the gateway 102. By means of a second protocol, the messages are transmitted between the gateway and the account I/O server 103. I/O operations on the data from the subscriber database 104 are carried out by low-level applications or routines that are coupled with processes. The wallet server 101 also serves a general management function and also operates to maintain and manage wallet account preferences. As shown here, the wallet server acts also as an authentication server, although a configuration is possible in which there is a separate authentication server. More will be said about the process of authentication below. Accountholders direct requests to the wallet server 101 by means of the client 106. The client 106 includes a user interface, as shown in FIG. 7 for editing wallet information and preferences. As previously stressed, this functionality is only available to holders of full wallet accounts.

As previously described, the subscriber database 104 contains a record for each of the account provider's subscribers. It is the information contained in these records that serves as the basis for the thin wallet. By default, each subscriber is automatically provided a thin wallet, using information obtained from the corresponding record in the subscriber database.

The wallet database 105 is also situated within the account provider's network. As shown here, the wallet server 101 is able to communicate directly with the wallet database 101, without the interposition of a gateway 102. Communication between the wallet database 105 and the wallet server 101 is by way of a standard database access interface, such as JDBC (JAVA database connectivity). Thus, because the wallet server 101 and the wallet database 105 communicate by way of a common interface, there need be no intermediation from the gateway 102.

The preceding system architecture is merely exemplary and is not intended to limit the scope of the invention. Other system architectures would also be suitable for accomplishing the purposes and objects of the invention, and are entirely within the scope of the invention.

Figure 2:
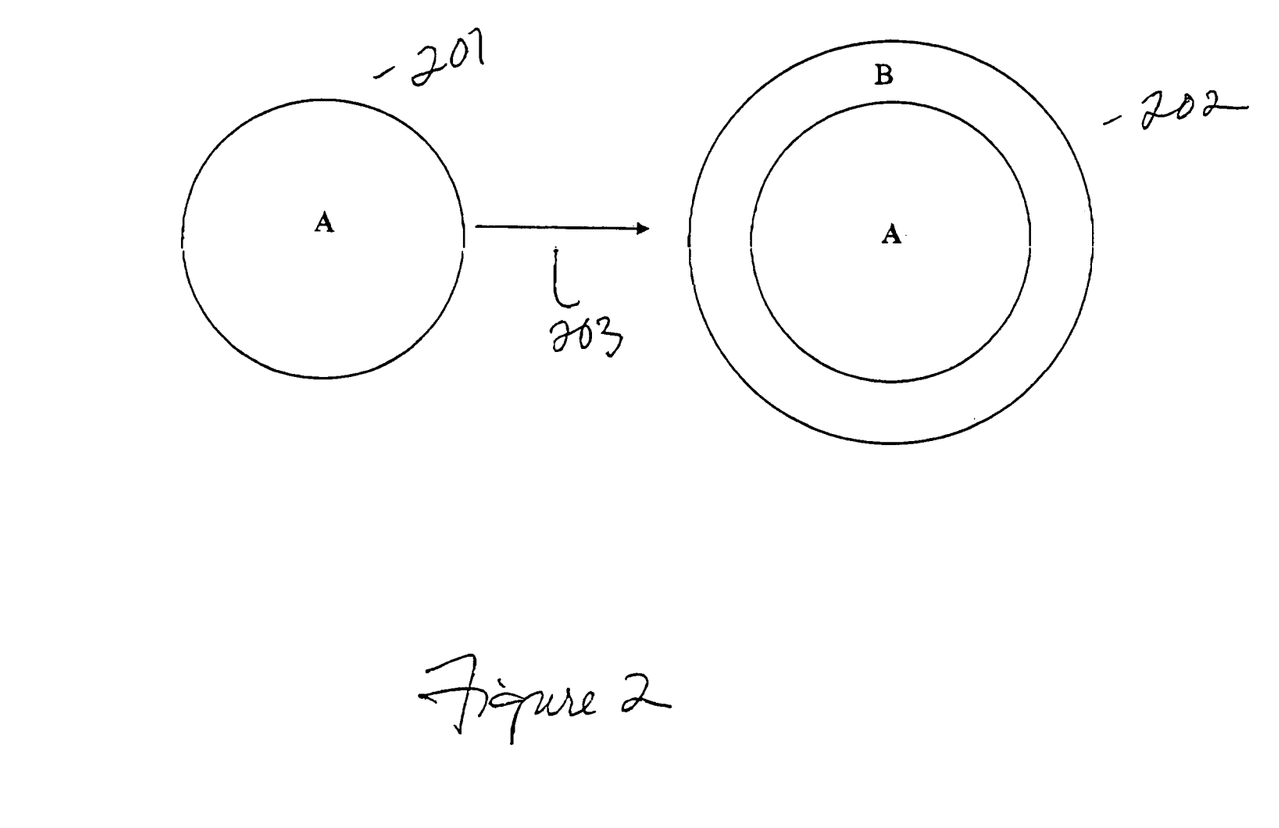
FIG. 2 provides a diagram illustrating the differences between thin wallet and full wallet functionality according to the invention.

As indicated above, the holder of a thin wallet account will often eventually require the increased security and enhanced features provided by a full wallet. FIG. 2 illustrates the differences between the thin wallet 201 and the full wallet 202 functionality. The thin wallet provides a basic, or core functionality, denoted by 'A.' The functionality includes a first level of authentication, and the ability to complete transactions requiring only this first level of authentication, using the default account information stored in the subscriber database 104. Significantly, the holder of thin wallet account has no editing rights, thus they are not able to, for example, manage account preferences, or add or delete a credit card, or update address information. Typically, the need for the increased functionality 'B' provided by the full wallet 202 arises when the accountholder attempts a transaction requiring a shopping password, or when they desire to edit account information. As indicated by arrow 203, the invention provides a process whereby the thin wallet 201 is converted to a full wallet 202 after the accountholder clears a one-time challenge response mechanism. As shown in FIG. 2, the thin wallet is permanently converted into a full wallet providing both 'A' and 'B.'

Figure 3:
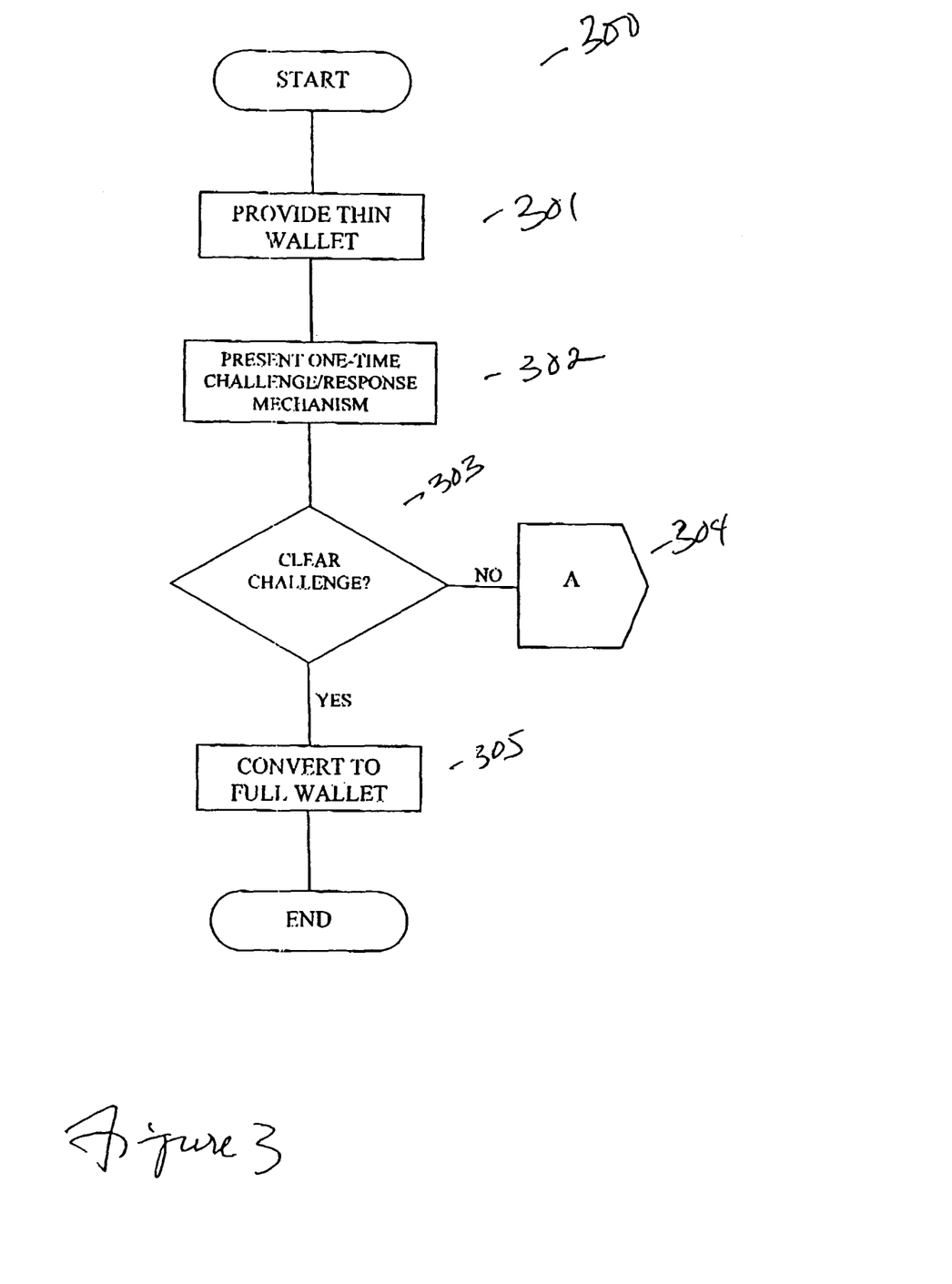
FIG. 3 provides a high-level flow diagram of a process for converting a wallet account according to the invention.

FIG. 3 provides a top-level flow diagram of the process 300 of wallet conversion. As explained in the preceding description, the accountholder, by default, is provided 301 with a thin wallet, using account information from the subscriber database 104. Alternatively, a thin wallet can be created for a user using information supplied at the time an online purchase is made. The accountholder gains access to the services provided by this account by authenticating at a first level. Upon requesting a service requiring higher level authentication, the accountholder is presented with a one time challenge/response mechanism. Typically the challenge requires the provision of personal information known only to the accountholder, for example, the accountholder may be required to provide at least a portion of the credit card number stored in the account. One embodiment of the invention presents the accountholder with the last four digits of the credit card number stored in the thin wallet, and requires the accountholder to provide the preceding twelve digits. Other forms of challenge/response will occur to the skilled practitioner, and are well within the scope of the invention. Upon successfully clearing the challenge 303, the thin wallet is permanently converted to a full wallet 305. As shown in FIG. 2, the full wallet provides all of the functionality of the thin wallet, plus an additional level of security, and an array of services associated with the increased level of security. Alternatively, the individual requesting service may not clear the challenge successfully 304. This may be because the accountholder cannot remember the personal information required by the challenge/response, or because someone other that the rightful accountholder is attempting to access the account.

Figure 4:
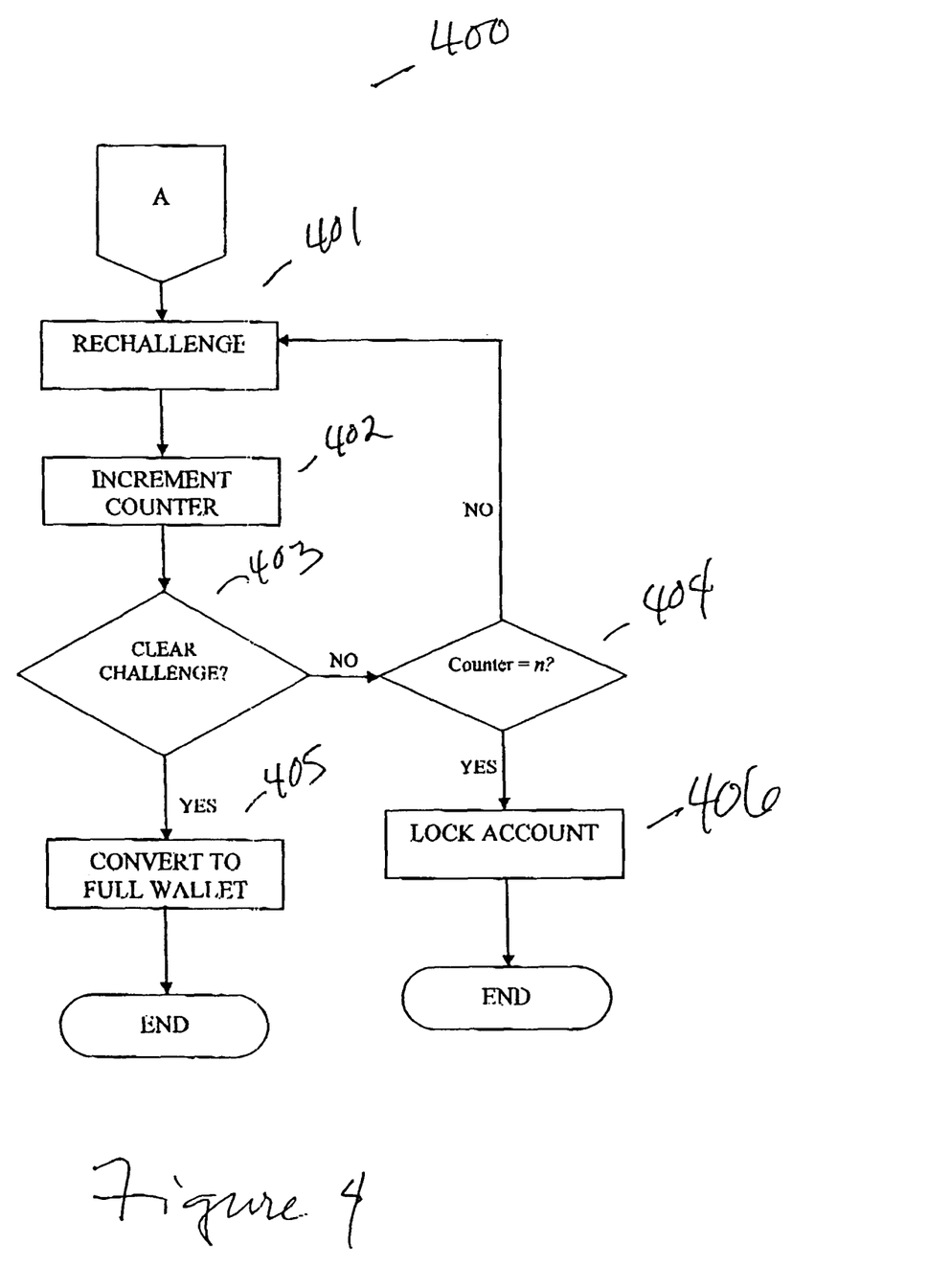
FIG. 4 provides a continuation of the flow diagram of FIG. 3 according to the invention.

FIG. 4 shows a sub-process for rechallenging an accountholder who has failed the challenge/response mechanism. As shown, the accountholder is rechallenged 401, requesting the same personal information as previously requested. Each time the accountholder is challenged, a counter is incremented 402. If, upon being rechallenged, the accountholder successfully clears the challenge 403, process flow proceeds in the normal fashion to conversion of the thin wallet to a full wallet 405. If the accountholder again fails the challenge, the challenge can be presented again 401. When the allowed number of attempts is exceeded 404, denoted here by n, the account is locked for a predetermined period of time. After the predetermined period of time has elapsed, the accountholder is again allowed to attempt to access the wallet account. Both the number of permissible attempts and the lockout period are configurable by the account provider. In the preferred embodiment of the invention, the permissible number of challenges is set to three and the lockout period is twenty-four hours.

Figure 5:
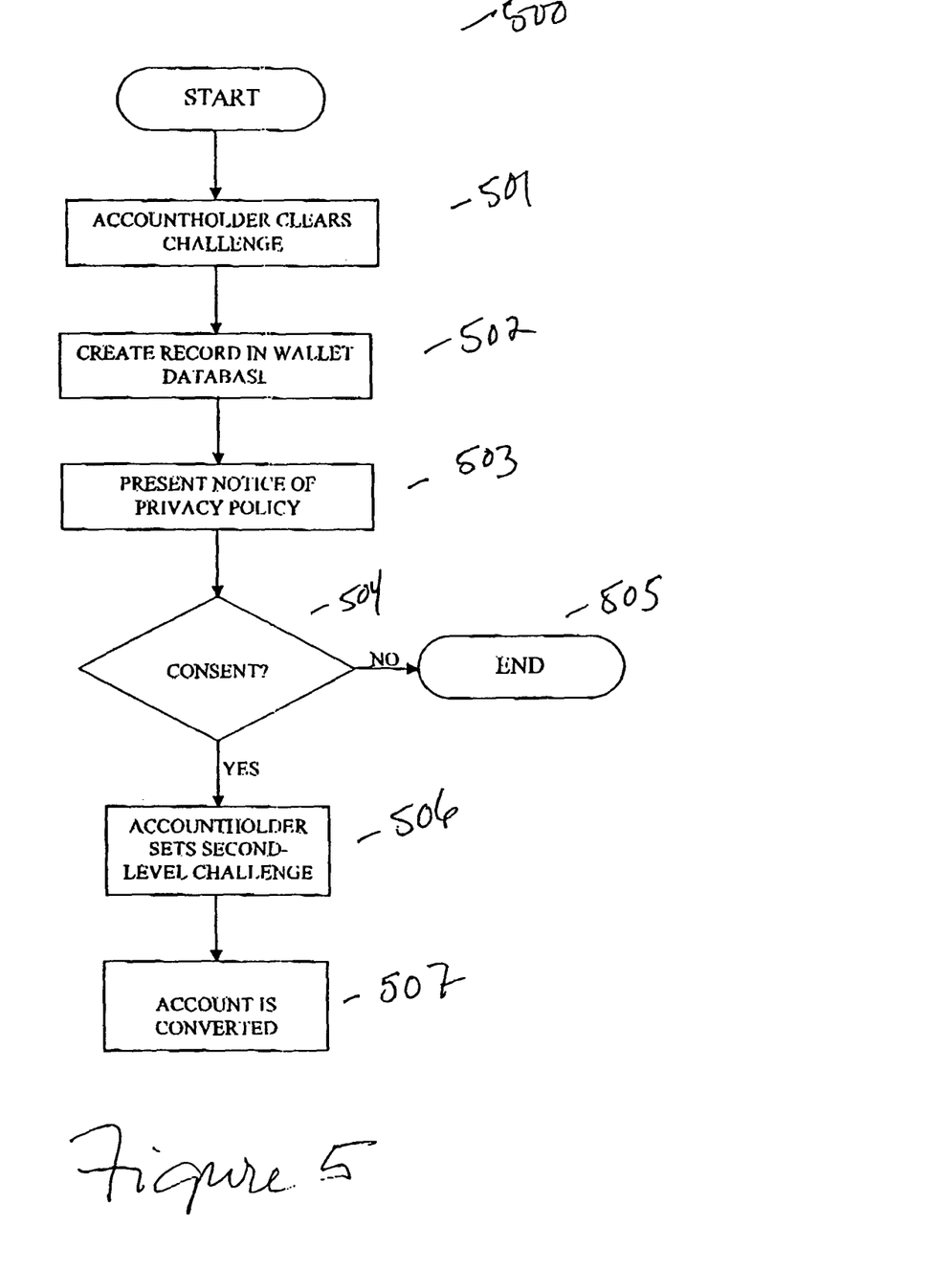
FIG. 5 provides detailed flow diagram of the process of FIG. 3 according to the invention.

FIG. 5 shows a flow diagram of a sub-process for converting a thin wallet account to a full wallet account 500. While the conversion has been previously described as occurring in a single step after the accountholder clears the one-time challenge/response, account conversion is itself a multi-step process. As in the foregoing description the accountholder clears the challenge/response mechanism 501. Until now, little has been said about the wallet database 105. It is the wallet database 105 that allows the provision of the additional functionality of the full wallet account. After the accountholder clears the challenge 501, a record is created in the wallet database 105. The wallet database 105 includes multiple data files, tables for example, that contain much of the same account information as in the subscriber database 104. Preferably, the wallet database contains at least member, shipping address and billing address tables. Thus, after clearing the challenge, an entry is created for the accountholder in each of the tables of the wallet database. An important feature of the wallet database 105 is that the accountholder has direct access to the account information by way of a user interface (FIG. 7) accessed through the client 106. The client 106 is preferably a conventional web browser; however other alternatives are consistent with the spirit and scope of the invention. The account information will only exist in the wallet database after an accountholder has cleared the challenge/response mechanism.

After a wallet record is created 501 in the wallet database, the accountholder is presented with a notice of the account provider's privacy policy. Those skilled in the fields of e-commerce and financial services will be familiar with the requirements of the Financial Modernization Act of 1999, commonly known as the Gramm-Leach-Bliley Act. The financial privacy rule embodied in the Act governs the collection and disclosure of accountholders' personal financial information by financial institutions. The rule also applies to any organization that receives such information. The safeguards rule of the Act requires such organizations to design, implement, and maintain safeguards to protect accountholder information. The notice of privacy policy 503 advises the accountholder of the procedures and policies in place for protection of the accountholder's financial information. The preferred embodiment of the invention requires the accountholder's consent 504 to the privacy policy for the sub-process to proceed. If consent is not given, the process terminates 505. Other embodiments of the invention are possible, however, wherein the consent step is omitted, or is optional. Alternatively, the accountholder may be given a configurable number of opportunities to consent to the privacy policy before the process is terminated. In the event that the conversion process is terminated, the wallet account remains a thin wallet. After consenting to the privacy policy, the accountholder is asked to set a second-level security challenge 506. The second-level challenge can include one or both of a second-level password and a security question. Conventionally, an accountholder is provided a menu of possible questions, for example, one's place of birth, mother's maiden name, the name of a favorite pet, and so on. Additionally, accountholders may design their own security challenges. Following the setting of the second level challenge, the account is converted 507 to a full wallet, for all time.

Figure 6:
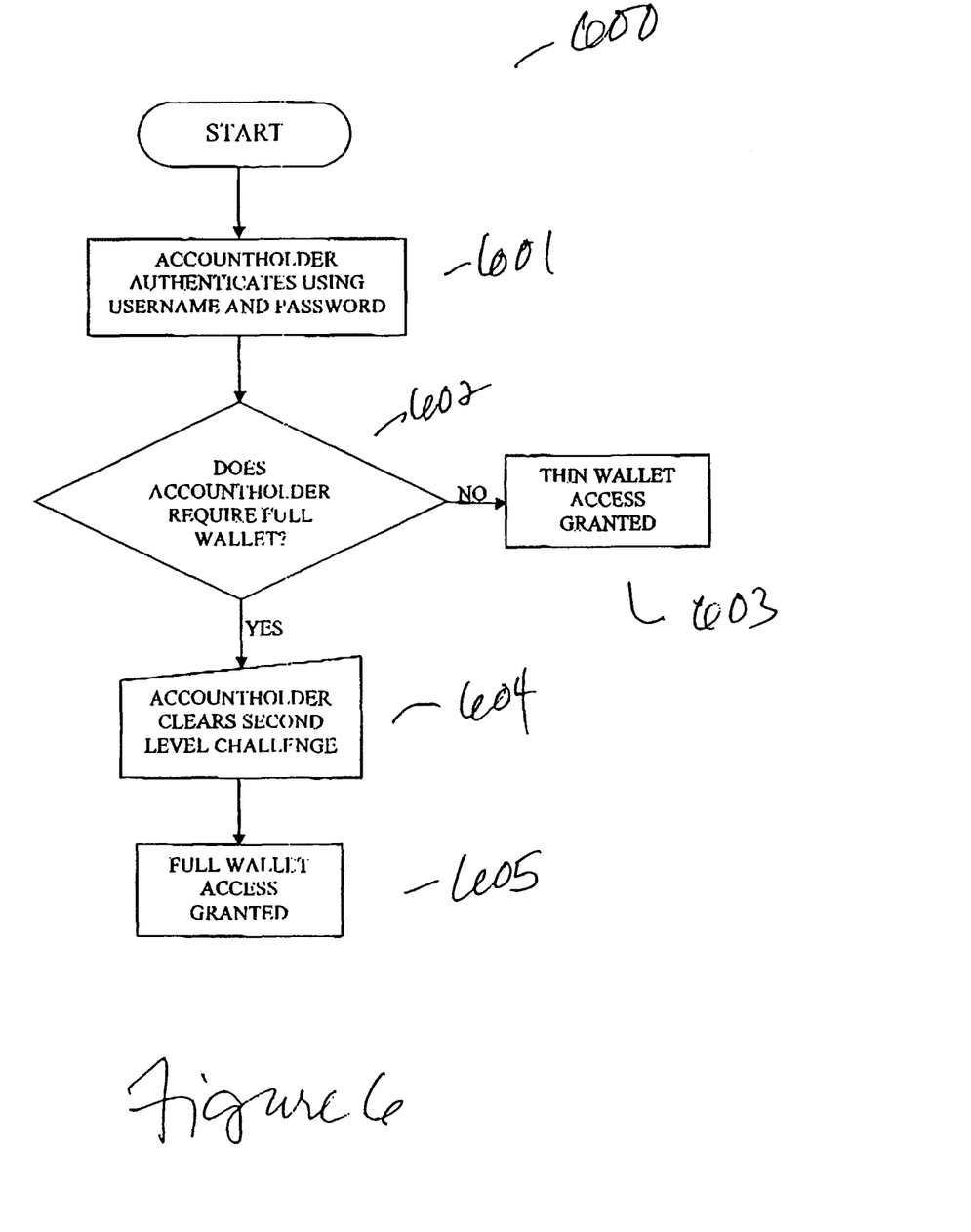
FIG. 6 provides a flow diagram of a sub-process for authenticating to a full wallet account according to the invention.

As shown in FIG. 2, the full wallet provides two levels of functionality, 'A' and 'B'. FIG. 6 provides a flow diagram of a sub-process for authentication 600 to a full wallet account. Initially, the accountholder authenticates at the first level 601, providing username and password. At this point the accountholder has access to the functionality at the 'A' level, the default account functionality. If the lower level of functionality is sufficient, no further authentication is required. Thus, authentication at the first-level grants the accountholder access to thin wallet functionality 603. If the accountholder requires 'B' level functionality 602, additional authentication is required. Thus, the accountholder must authenticate at the higher level by meeting a second-level challenge 604. The second level challenge can be one or both of providing the second-level password or answering the security question. After passing the challenge, full wallet access is granted 605.

As in the foregoing description, the client 106 provides a user interface for editing account information and preferences. FIG. 7 provides a screen shot of a user interface for editing wallet information and preferences. While the fields are shown blank here, in the case of a full wallet account, the fields would be populated with the account information. It must be stressed that this editing function is particular to the full wallet. The thin wallet pulls subscriber information from the subscriber database 104. Due to its sensitive nature, 'write' access to the subscriber database is extremely limited. The low-level security provided with the thin wallet is insufficient to protect the information stored in the subscriber database. Thus, no functionality is provided for editing this information.

As originally observed, while second-level passwords are deemed necessary to protect the sensitive nature of the data store within the wallet, the additional password unavoidably creates a barrier to usage. A further embodiment of the invention is possible wherein the client machine an accountholder typically accesses their wallet account from may be designated a trusted machine. The principle underlying this embodiment is that the accountholder authenticates at the second level a first time. The act of authenticating from a particular client device allows this device to be designated by the wallet server as a trusted machine. The machine's trusted status eliminates the necessity of second-level authentication. Various means of recognizing the trusted machine are possible, for example the wallet server or an authentication server can issue a usage statement or a trust token. Alternatively, passive usage patterns may be used to establish the trusted machine.

An important feature of the trusted machine is that any time the trusted state has been compromised, the state is reset. Achieving trusted status would require that the accountholder authenticate at the second level again. Preferably, visual feedback is provided to the accountholder that the machine is in a trusted state, for example an icon prominently displayed on the desktop of the trusted machine.

A further embodiment of the invention provides a security controls panel that permits accountholders to manage authentication for various online products and sites. For example, the accountholder is given the ability to set and edit second level passwords for other secure applications in addition to the wallet. A further embodiment is possible, in which a security panel allows the accountholder to manage all privacy and security related features, for example:

passwords;
anti-virus protection;
cookie blocking; and
a URL black list.

Furthermore, the security controls panel has the ability to detect international accounts, thus security measures are manageable on a country-by-country basis.

Although the invention has been described herein with reference to certain preferred embodiments, one skilled in the art will readily appreciate that other applications may be substituted for those set forth herein without departing from the spirit and scope of the present invention. Accordingly, the invention should only be limited by the claims included below.

The invention claimed is:

1. A method comprising steps of:
providing, via a computing device, a first set of e-commerce services to an accountholder of a first account type, the first set of services requiring a single authentication level;
presenting, via a computing device, a one-time challenge/response mechanism that requires said accountholder to provide information known only to the accountholder comprising at least a portion of a credit card number stored in said first account type that is associated with said accountholder;
if the accountholder clears the challenge, creating, via a computing device, a second account type requiring, for subsequent transactions, multiple authentication levels, and providing a different set of services for each authentication level,
if the holder of the first set of services does not clear the challenge, allowing, via a computing device, a predetermined number of attempts to enter the information known only to the holder of the first set of services; and
if the holder of the first set of services fails the predetermined number of attempts, allowing, via a computing device, the holder of the first set of services to provide a new credit card number; and
presenting a challenge based on the new credit card number.

2. The method of claim 1, wherein the step of providing the first set of services comprises either of the steps of:
creating, via a computing device, the first set of services when making an initial purchase; and
creating, via a computing device, a record in a subscriber database.

3. The method of claim 2, wherein subscribers include subscribers to any of:
an online service; and
an ISP (Internet service provider).

4. The method of claim 1, wherein the step of presenting a challenge/response mechanism comprises steps of:
requesting, via a computing device, a service from within the first set of services that is only available from within a wallet account; and
one time only, prompting, via a computing device, the holder of the first set of services to provide the information known only to the holder of the first set of services.

5. The method of claim 1, wherein the different set of services for each authentication level comprise tasks requiring greater security than the level of security provided by said single authentication level.

6. The method of claim 5, wherein the additional tasks comprise any of:
editing the default account information;
editing account preferences;
making purchases that exceed a predetermined purchase amount; and
making purchases at sites that require additional authentication beyond said single authentication level.

7. The method of claim 1, further comprising steps of:
configuring, via a computing device, the challenge by an account provider, wherein configuring the challenge includes:
specifying information requested by the challenge; and
specifying a permissible number of response attempts.

8. The method of claim 1, wherein the step of converting the first set of services comprises steps of:
creating, via a computing device, a record in a wallet account database;
providing, via a computing device, notice of a privacy policy; and
consenting, via a computing device, to the privacy policy by the holder of the first set of services.

9. The method of claim 8, wherein the step of creating an electronic wallet further comprises a step of:
creating, via a computing device, at least a second-level challenge.

10. The method of claim 9, wherein the step of creating at least a second-level challenge comprises any of the steps of:
setting, via a computing device, a second-level password; and
configuring, via a computing device, a security question by the holder of the first set of services.

11. The method of claim 1, further comprising a step of:
providing, via a computing device, a user interface accessible only to holders of wallet accounts to edit account information and preferences.

12. A computer program product comprising a non-transitory medium having computer readable code embodied thereon, the computer code configured for performing a method comprising steps of:
providing a first set of e-commerce services to an accountholder of a first account type, the first set of services requiring a single authentication level;
presenting a one-time challenge/response mechanism that requires the accountholder to provide information known only to the accountholder comprising at least a portion of a credit card number stored in said first account type that is associated with said accountholder; and
if the accountholder clears the challenge, creating, via a computing device, a second account type requiring, for subsequent transactions, multiple authentication levels, and providing a different set of services for each authentication level,
if the holder of the first set of services does not clear the challenge, allowing, via a computing device, a predetermined number of attempts to enter the information known only to the holder of the first set of services; and
if the holder of the first set of services fails the predetermined number of attempts, allowing, via a computing device, the holder of the first set of services to provide a new credit card number; and presenting a challenge based on the new credit card number.

13. A system comprising:
a wallet server comprising at least one computer processor;
a wallet database;
a subscriber database, wherein said wallet database is distinct from said subscriber database;
wherein the wallet server is in communication with the wallet and the subscriber databases;
a client in communication with the wallet server, wherein a wallet accountholder requests services from the wallet server; and
a computer program executing on said wallet server, said computer program configured for:
providing a first set of e-commerce services to an accountholder of a first account type, the first set of services requiring a single authentication level;
presenting a one-time challenge/response mechanism that requires the accountholder to provide information known only to the accountholder comprising at least a portion of a credit card number stored in said first account type that is associated with said accountholder;

if the accountholder clears the challenge, creating, via a computing device, a second account type requiring, for subsequent transactions, multiple authentication levels, and providing a different set of services for each authentication level, if the holder of the first set of services does not clear the challenge, allowing, via a computing device, a predetermined number of attempts to enter the information known only to the holder of the first set of services; and if the holder of the first set of services fails the predetermined number of attempts, allowing, via a computing device, the holder of the first set of services to provide a new credit card number; and presenting a challenge based on the new credit card number.

* * * * *